United States Patent
Katayama et al.

(10) Patent No.: US 11,765,640 B2
(45) Date of Patent: Sep. 19, 2023

(54) WIRELESS COMMUNICATION SYSTEM, CONTROL METHOD, CONTROL APPARATUS, AND CONTROL PROGRAM

(71) Applicant: NIPPON TELEGRAPH AND TELEPHONE CORPORATION, Tokyo (JP)

(72) Inventors: Yohei Katayama, Musashino (JP); Takafumi Fujita, Musashino (JP); Hideya So, Musashino (JP); Kento Yoshizawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 382 days.

(21) Appl. No.: 17/257,650

(22) PCT Filed: Jun. 25, 2019

(86) PCT No.: PCT/JP2019/025097
§ 371 (c)(1),
(2) Date: Jan. 4, 2021

(87) PCT Pub. No.: WO2020/008945
PCT Pub. Date: Jan. 9, 2020

(65) Prior Publication Data
US 2021/0274421 A1    Sep. 2, 2021

(30) Foreign Application Priority Data
Jul. 6, 2018    (JP) .................... 2018-128992

(51) Int. Cl.
*H04W 76/10* (2018.01)
*H04W 40/14* (2009.01)
*H04L 1/22* (2006.01)

(52) U.S. Cl.
CPC .............. *H04W 40/14* (2013.01); *H04L 1/22* (2013.01)

(58) Field of Classification Search
None
See application file for complete search history.

(56) References Cited

U.S. PATENT DOCUMENTS

2014/0313903 A1* 10/2014 Kikuzuki ............... H04W 8/04
370/238

FOREIGN PATENT DOCUMENTS

| JP | 2008227850 A | 9/2008 |
|---|---|---|
| JP | 2014216709 A | 11/2014 |
| JP | 2015103849 A | 6/2015 |

OTHER PUBLICATIONS

Hideya So et al., Delay Performance Evaluation under Interference from Other System of Highly Reliable and Low Latency Radio Access Scheme by Utilizing Duplicated Transmissions, IEICE Technical Report, 2017.

* cited by examiner

*Primary Examiner* — Willie J Daniel, Jr.
(74) *Attorney, Agent, or Firm* — Harness, Dickey & Pierce, P.L.C.

(57) ABSTRACT

A wireless communication system includes three or more wireless communication apparatuses and a control apparatus, wherein the control apparatus includes a setting unit configured to determine, for each of a plurality of paths from a first one of the wireless communication apparatuses to a second one of the wireless communication apparatuses, a total product value being a result of computing a total product of arrival probabilities of radio frames of respective radio sections constituting the path and a search unit configured to select a path, among the plurality of paths, with the number of transmission times of the radio frame for each of the paths being a predetermined number of times or smaller and the total product value being a predetermined threshold or more.

8 Claims, 9 Drawing Sheets

| RADIO SECTION | NUMBER OF AVAILABLE RADIO LINKS | AVAILABLE CHANNEL | ARRIVAL PROBABILITY OF RADIO FRAME (NOT INCLUDING RETRANSMISSION) |
|---|---|---|---|
| A-B | 2 | Ch40 | 0.8 |
| | | Ch36 | 0.75 |
| | | ... | ... |
| A-C | 2 | Ch1 | 0.5 |
| | | Ch6 | 0.45 |
| | | ... | ... |
| A-D | 2 | Ch108 | 0.6 |
| | | Ch104 | 0.4 |
| | | ... | ... |
| ... | ... | ... | ... |

|  |  | END POINT | | | | | |
|---|---|---|---|---|---|---|---|
|  |  | A | B | C | D | E | F |
| STARTING POINT | A | DETERMINATION FLAG: DETERMINED ARRIVAL PROBABILITY TOTAL PRODUCT VALUE: 1 UPLINK: NONE NUMBER OF HOPS: 0 | DETERMINATION FLAG: DETERMINED ARRIVAL PROBABILITY TOTAL PRODUCT VALUE: 0.8 UPLINK: A NUMBER OF HOPS: 1 | DETERMINATION FLAG: NOT SET ARRIVAL PROBABILITY TOTAL PRODUCT VALUE: 0.9 UPLINK: A NUMBER OF HOPS: 1 | DETERMINATION FLAG: NOT SET ARRIVAL PROBABILITY TOTAL PRODUCT VALUE: 0.5 UPLINK: A NUMBER OF HOPS: 1 | DETERMINATION FLAG: NOT SET ARRIVAL PROBABILITY TOTAL PRODUCT VALUE: 0 UPLINK: 0 NUMBER OF HOPS: 0 | DETERMINATION FLAG: NOT SET ARRIVAL PROBABILITY TOTAL PRODUCT VALUE: 0 UPLINK: 0 NUMBER OF HOPS: 0 |
|  | B | DETERMINATION FLAG: DETERMINED ARRIVAL PROBABILITY TOTAL PRODUCT VALUE: 0.8 UPLINK: A NUMBER OF HOPS: 1 |  | DETERMINATION FLAG: NOT SET ARRIVAL PROBABILITY TOTAL PRODUCT VALUE: NOT SET UPLINK: NOT SET NUMBER OF HOPS: NOT SET | DETERMINATION FLAG: NOT SET ARRIVAL PROBABILITY TOTAL PRODUCT VALUE: 0.7 UPLINK: B NUMBER OF HOPS: 2 | DETERMINATION FLAG: NOT SET ARRIVAL PROBABILITY TOTAL PRODUCT VALUE: 0.4 UPLINK: B NUMBER OF HOPS: 2 | DETERMINATION FLAG: NOT SET ARRIVAL PROBABILITY TOTAL PRODUCT VALUE: 0.088 UPLINK: B NUMBER OF HOPS: 3 |
|  | C |  |  |  |  |  |  |
|  | D |  |  |  |  |  |  |
|  | E |  |  |  |  |  |  |
|  | F |  |  |  |  |  |  |

Fig. 5

Fig. 9

WIRELESS COMMUNICATION SYSTEM, CONTROL METHOD, CONTROL APPARATUS, AND CONTROL PROGRAM

CROSS-REFERENCE TO RELATED APPLICATIONS

This application is a 371 U.S. National Phase of International Application No. PCT/JP2019/025097, filed on Jun. 25, 2019, which claims priority to Japanese Application No. 2018-128992 filed on Jul. 6, 2018. The entire disclosures of the above applications are incorporated herein by reference.

TECHNICAL FIELD

The present invention relates to a wireless communication system, a control method, a control apparatus, and a control program.

BACKGROUND ART

Some wireless communication systems include a transmitter that performs redundant communications for transmitting replicated packets using radio frames of a plurality of frequency bands and a receiver that obtains, as a packet, the first radio frame received normally. Such a wireless communication system can achieve high reliability with respect to packet arrival probability (radio frame arrival probability) within a required delay time even in environments where the probability of radio frame loss is high (see NPL 1).

Each wireless communication system illustrated in FIGS. 11 to 13 includes three wireless communication apparatuses. Between each two wireless communication apparatuses, there is a radio section that configures a wireless multi-hop path. The wireless communication apparatuses communicate with each other through the radio section of a selected path. One radio section may include a plurality of radio links. The wireless communication apparatuses can utilize the plurality of radio links to perform redundant communication.

FIG. 11 is a diagram illustrating a first example of selection of a wireless multi-hop path. In FIG. 11, a wireless communication system selects a first radio section as the shortest path so that the number of hops (the number of radio sections in the path) would be small. However, in a case that the rate of radio frame loss (hereinafter referred to as a "frame loss rate") is high in the first radio section (radio link) of the shortest path, redundant communication using a plurality of radio links is required. Thus, resource consumption of the shortest path (the first radio section) may sometimes be greater than the resource consumption of a path that is not the shortest (the second radio section and the third radio section).

FIG. 12 is a diagram illustrating a second example of selection of a wireless multi-hop path. In FIG. 12, a wireless communication system determines, for each radio section, whether a required packet arrival probability is satisfied, i.e., whether a required reliability (hereinafter referred to as a "reliability requirement") is satisfied. However, even if the path satisfies the reliability requirement in each radio section, the path from the starting point to the end point (between a wireless communication apparatus A and a wireless communication apparatus Z) may not satisfy the reliability requirement in some cases.

In FIG. 12, the reliability requirement is reliability that the percentage of packets (radio frames) each of which arrives within seven times of transmission, for example, is 99.99% or higher. The frame loss rate of the first radio section is, for example, 10%. The frame loss rate of the second radio section is, for example, 20%.

In this case, the reliability requirement is satisfied in the first radio section (the percentage of packets each of which arrives within seven times of transmission is 99.99999%). In the second radio section, the reliability requirement is satisfied (the percentage of packets each of which arrives within seven times of transmission is 99.99872%). However, between the wireless communication apparatus A and the wireless communication apparatus Z, the reliability requirement is not satisfied (the percentage of packets each of which arrives within seven times is 99.98856%). As described above, a control apparatus of the wireless communication system may sometimes select a path that does not satisfy the reliability requirement.

FIG. 13 is a diagram illustrating a third example of selection of a wireless multi-hop path. In FIG. 13, a control apparatus of a wireless communication system divides a required delay (hereinafter referred to as a "delay requirement"), based on the number of hops in the path from the starting point to the end point. The control apparatus of the wireless communication system determines a reliability requirement for each radio section, based on the result of the division. The delay requirement is expressed using the upper limit of the number of transmission times of a radio frame.

In FIG. 13, the reliability requirement is reliability that the percentage of packets each of which arrives within eight times of transmission, for example, is 99.99% or higher in the path from the wireless communication apparatus A to the wireless communication apparatus Z. To satisfy this reliability requirement, the reliability requirement for each radio section needs to be that the percentage of packets each of which arrives within four times of transmission is 99.99% or higher. Here, by dividing eight times corresponding to the upper limit of the number of transmission times, which is the delay requirement, by the number of hops "2", the upper limit of the number of transmission times of each radio section is determined to be within four times.

The frame loss rate of the first radio section is, for example, 15%. The frame loss rate of the second radio section is, for example, 20%. In this case, the percentage of packets each of which arrives within four times of transmission is 99.949375% in the first radio section and is 99.84% in the second radio section. Thus, it is determined that neither the first radio section nor the second radio section satisfies the reliability requirement. However, between the wireless communication apparatus A and the wireless communication apparatus Z, the percentage of packets each of which reaches within eight times of transmission is 99.9960581%, and hence the reliability requirement is satisfied. Thus, the wireless communication system falsely determines that the first radio section and the second radio section, which satisfy the reliability requirement, as radio sections that do not satisfy the reliability requirement. Based on this false determination, the wireless communication system may sometimes perform unnecessary redundant communication.

CITATION LIST

Non Patent Literature

NPL 1: So, Naya, Fujita, Yoshizwa, and Shimizu, "Delay Performance Evaluation under Interference from Other System of Highly Reliable and Low Latency Radio Access Scheme by Utilizing Duplicated Transmissions", IEICE technical report, RCC2017-42 (2017-07)

SUMMARY OF THE INVENTION

Technical Problem

In a case that a radio frame passes through a plurality of radio sections, such as in wireless multi-hops in a radio access network (wireless backhaul), a reliability requirement may not be satisfied between terminal points of a path including a plurality of radio sections even if one of the radio sections satisfies the reliability requirement.

However, known control apparatuses may not be able to select a path that satisfies a reliability requirement and a delay requirement for wireless multi-hops in some cases.

In view of the above circumstances, an object of the present invention is to provide a wireless communication system, a control method, a control apparatus, and a control program that can select a path satisfying a reliability requirement and a delay requirement for wireless multi-hops.

Means for Solving the Problem

An aspect of the present invention is a wireless communication system including: three or more wireless communication apparatuses; and a control apparatus, wherein the control apparatus includes a setting unit configured to determine, for each of a plurality of paths from a first one of the wireless communication apparatuses to a second one of the wireless communication apparatuses, a total product value being a result of computing a total product of arrival probabilities of radio frames of respective radio sections constituting the path and a search unit configured to select a path, among the plurality of paths, with the number of transmission times of the radio frame for each of the paths being a predetermined number of times or smaller and the total product value being a predetermined threshold or more.

An aspect of the present invention is the above-described wireless communication system, in which the setting unit determines the number of transmission times of the radio frame, based on a result of dividing a logarithm value of a complementary event of a predetermined arrival probability by a logarithm value of a complementary event of a result of computing a total product of arrival probabilities of the radio frame of the respective radio sections for each of the plurality of paths.

An aspect of the present invention is the above-described wireless communication system, in which, in a case that the number of transmission times of the radio frame for each of the paths exceeds the predetermined number of times, the setting unit detects the radio section with the arrival probability of the radio frame being lower than a predetermined probability in a path with a total product value being the largest, and increases redundancy for communication of the detected radio section.

An aspect of the present invention is a control method executed by a wireless communication system including three or more wireless communication apparatuses and a control apparatus, the control method including: by the control apparatus determining, for each of a plurality of paths from a first one of the wireless communication apparatuses to a second one of the wireless communication apparatuses, a total product value being a result of computing a total product of arrival probabilities of radio frames of respective radio sections constituting the path and selecting a path, among the plurality of paths, with the number of transmission times of the radio frame for each of the paths being a predetermined number of times or smaller and the total product value being a predetermined threshold or more.

An aspect of the present invention is the above-described wireless communication method, in which the control apparatus determines the number of transmission times of the radio frame, based on a result of dividing a logarithm value of a complementary event of a predetermined arrival probability by a logarithm value of a complementary event of a result of computing a total product of arrival probabilities of the radio frame of the respective radio sections for each of the plurality of paths.

An aspect of the present invention is a control apparatus including: a setting unit configured to determine, for each of a plurality of paths from a first one of three or more wireless communication apparatuses to a second one of the wireless communication apparatuses, a total product value being a result of computing a total product of arrival probabilities of radio frames of respective radio sections constituting the path and a search unit configured to select a path, among the plurality of paths, with the number of transmission times of the radio frame for each of the paths being a predetermined number of times or smaller and the total product value being a predetermined threshold or more.

An aspect of the present invention is the above-described wireless communication apparatus, in which the setting unit determines the number of transmission times of the radio frame, based on a result of dividing a logarithm value of a complementary event of a predetermined arrival probability by a logarithm value of a complementary event of a result of computing a total product of arrival probabilities of the radio frame of the respective radio sections for each of the plurality of paths.

An aspect of the present invention is a control program for causing a computer to operate as the control apparatus described above.

Effects of the Invention

According to the present invention, it is possible to select a path that satisfies a reliability requirement and a delay requirement for wireless multi-hops.

BRIEF DESCRIPTION OF DRAWINGS

FIG. 5 is a diagram illustrating an example of a path tree data table according to the embodiment.

FIG. 9 is a diagram illustrating an example of the numbers of transmission times for satisfying a reliability requirement according to arrival probability total product values according to the embodiment.

DESCRIPTION OF EMBODIMENTS

Embodiments of the present invention will be described in detail with reference to the drawings.

Figure 1:
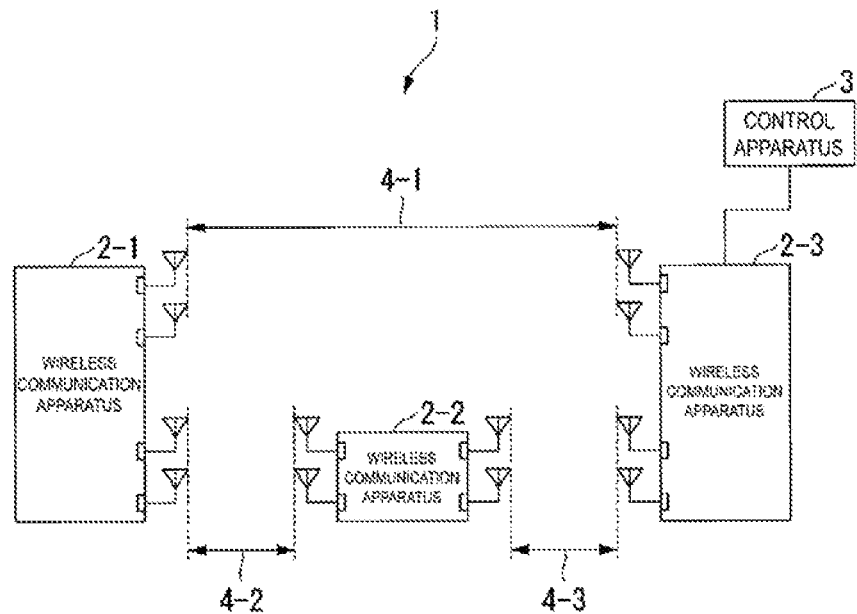
FIG. 1 is a diagram illustrating an example of a configuration of a wireless communication system according to an embodiment.

FIG. 1 is a diagram illustrating an example of a configuration of a wireless communication system 1. The wireless communication system 1 is a system that performs wireless multi-hop communication in a radio access network (wireless backhaul). The wireless communication system 1 includes a plurality of wireless communication apparatuses 2 and a control apparatus 3.

The wireless communication apparatuses 2 perform wireless multi-hop communication with a radio frame (packet) transmitted through a path defined by one or more radio sections selected by the control apparatus 3.

The transmission-side wireless communication apparatus 2 performs redundant communications for transmitting replicated packets by using radio frames of a plurality of frequency bands. The reception-side wireless communication apparatus 2 obtains the first radio frame that is received normally, as a packet.

The control apparatus 3 selects a path that satisfies a reliability requirement and a delay requirement for wireless multi-hops, from an arrival probability total product path tree. The arrival probability total product path tree is a path tree that has the wireless communication apparatuses 2 as nodes and represents an arrival probability total product value. The arrival probability total product value is a value obtained by computing a total product of the arrival probabilities of packets according to the path.

Figure 2:
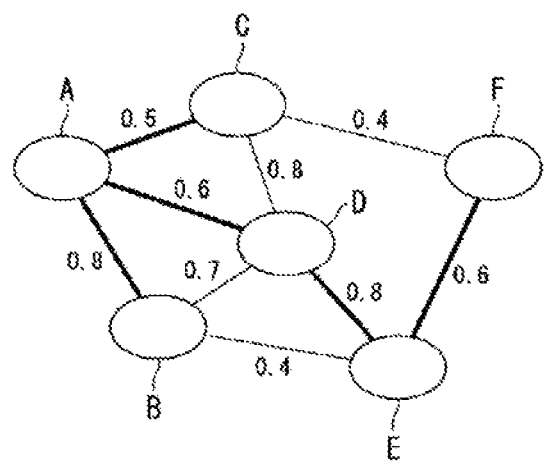
FIG. 2 is a diagram illustrating an example of an arrival probability total product path tree according to the embodiment.

FIG. 2 is a diagram illustrating an example of an arrival probability total product path tree. In the following, reference signs from "A" to "F" represent the respective wireless communication apparatuses 2. In the arrival probability total product path tree, the wireless communication apparatuses 2 correspond to nodes (points), and radio sections correspond to links. In FIG. 2, the starting point of the arrival probability total product path tree is a wireless communication apparatus denoted by the reference sign A. For example, the arrival probability of packets between the wireless communication apparatus (starting point) denoted by the reference sign A and the wireless communication apparatus (end point) denoted by the reference sign B is 0.8.

Figures 3, 4:
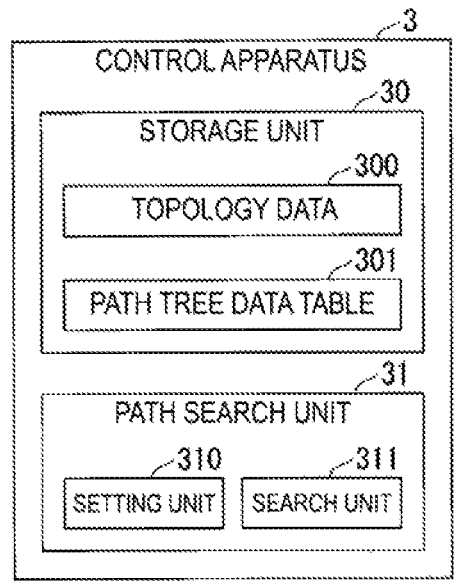
FIG. 3 is a diagram illustrating an example of a configuration of a control apparatus according to the embodiment.
FIG. 4 is a diagram illustrating an example of topology data according to the embodiment.

FIG. 3 is a diagram illustrating an example of a configuration of the control apparatus 3. The control apparatus 3 includes a storage unit 30 and a path search unit 31. The storage unit 30 is a non-volatile recording medium (non-transitory recording medium), for example, a flash memory, a hard disk drive (HDD), or the like. The storage unit 30 may include a volatile recording medium, for example, a random access memory (RAM) or a register.

The storage unit 30 stores topology data 300 as a topology data storage unit. The storage unit 30 stores a path tree data table 301 as a data table storage unit. The storage unit 30 may store a program to be executed by the path search unit 31.

The path search unit 31 is implemented, for example, by a processor, such as a central processing unit (CPU), executing a program stored in the storage unit. The path search unit 31 may be implemented by using hardware such as a large scale integration (LSI) or an application specific integrated circuit (ASIC).

The path search unit 31 includes a setting unit 310 and a search unit 311. The setting unit 310 sets a data table of an arrival probability total product path tree (hereinafter referred to as a "path tree data table"). Specifically, the setting unit 310 determines, for each of a plurality of paths from the first wireless communication apparatus 2 to the second wireless communication apparatus 2, a total product value obtained as a result of computing a total product of the arrival probabilities of radio frames of the respective radio sections constituting the path, as an arrival probability total product value. The search unit 311 selects a path that satisfies a reliability requirement and a delay requirement for wireless multi-hops, from the arrival probability total product path tree. In other words, the search unit 311 selects a path having the largest arrival probability total product value from the arrival probability total product path tree.

Next, details of the setting unit 310 will be described.

FIG. 4 is a diagram illustrating an example of the topology data 300. The topology data 300 is topology data of the arrival probability total product path tree. In the topology data, each radio section, the number of available radio links, available channels, and the arrival probabilities of radio frames (not including retransmission) are associated with each other. In the radio section "A-B", the number of available radio links is, for example, "2", available channels are, for example, "ch40" and the like, and the arrival probability of radio frames of "ch40" (not including retransmission) is, for example, 0.8.

FIG. 5 is a diagram illustrating an example of a path tree data table. Illustrated as an example is a path tree data table representing a state in the middle of path search prioritizing arrival probability in a case assuming that the wireless communication apparatus denoted by the reference sign B serves as the starting point and the wireless communication apparatus denoted by the reference sign A serves as the final determined point in the second row of the path tree data table.

Figure 6:
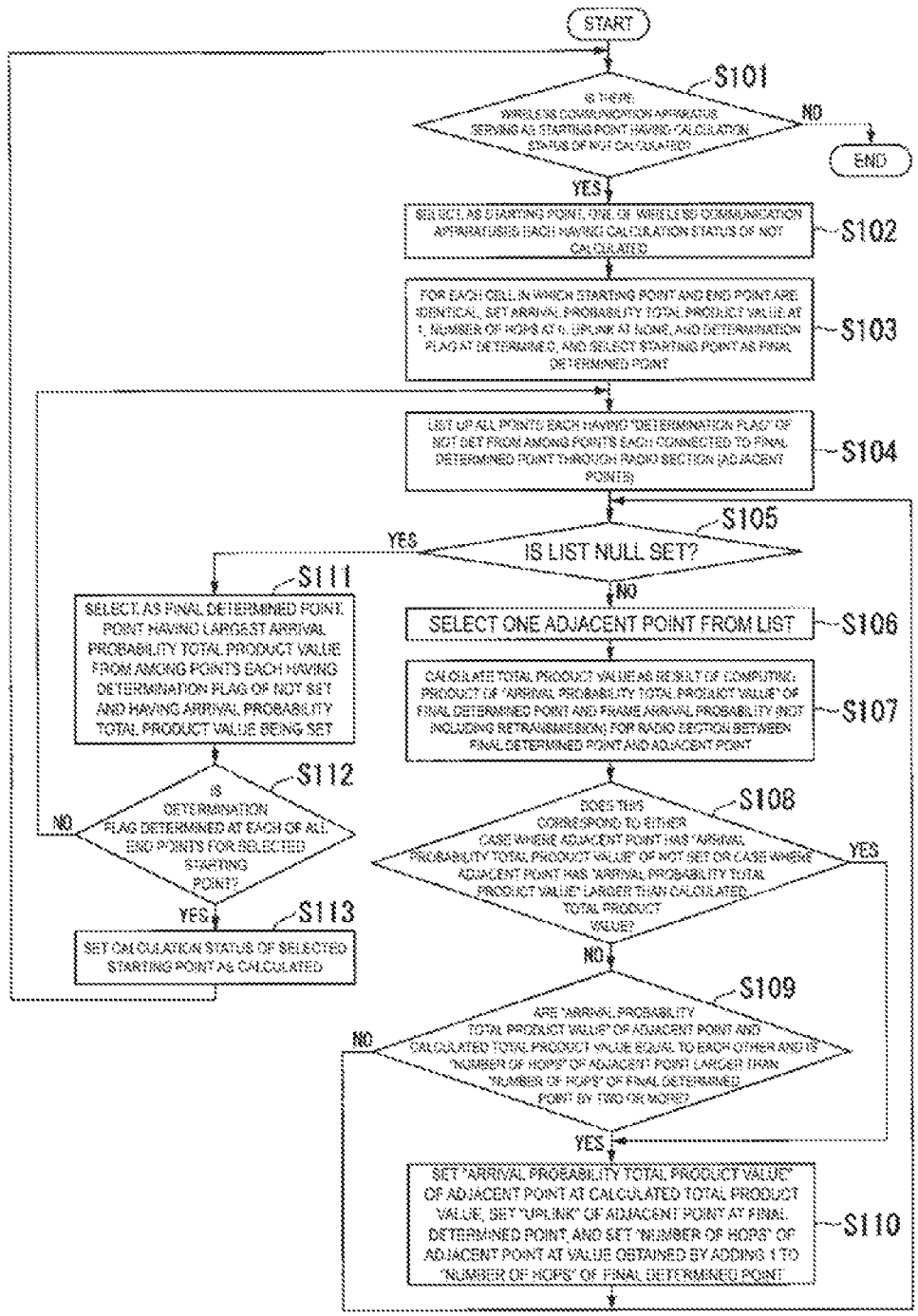
FIG. 6 is a flowchart illustrating an example of a procedure of setting a path tree data table by prioritizing arrival probability over the number of hops according to the embodiment.

Next, an operation procedure of the wireless communication system 1 will be described. FIG. 6 is a flowchart illustrating an example of a procedure for setting a path tree data table by prioritizing arrival probability over the number of hops. The wireless communication system 1 performs the operation procedure illustrated in FIG. 6 at a stage where a network for the wireless communication apparatuses 2 is established.

The setting unit 310 determines whether there is a wireless communication apparatus 2 serving as a starting point and having a calculation status (progress status of search processing) indicating not calculated in the path tree data table (step S101).

In a case that there is no wireless communication apparatus serving as a starting point and having a calculation status of not calculated in the path tree data table (step S101: NO), the setting unit 310 terminates the processing for setting the path tree data table.

In a case that there is a wireless communication apparatus (es) serving as a starting point and having a calculation status of not calculated in the path tree data table (step S101: YES), the setting unit 310 selects one of the wireless communication apparatus(es) having a calculation status of not calculated, as a starting point of the search processing (step S102).

For each cell in which a starting point and an end point are identical in the path tree data table, the setting unit 310 sets the arrival probability total product value (initial cost) at 1, the number of hops at 0, uplink at none, and a determination flag at determined. The setting unit 310 selects the starting point as a final determined point (step S103).

The setting unit 310 records, in a list, points that are adjacent to the final determined point (referred to as "adjacent points" below) in the arrival probability total product path tree having the wireless communication apparatuses 2 as nodes (points), i.e., all the points each having a determination flag indicating "not set" from among the points connected to the final determined point via one radio section (step S104).

The setting unit 310 determines whether the list is a null set (step S105). In a case that the list is a null set (step S105: YES), the setting unit 310 proceeds the processing to step S111. In a case that the list is not a null set (one or more points each having a determination flag of "not set" are recorded in the list) (step S105: NO), the setting unit 310 selects one adjacent point from the list (step S106).

The setting unit 310 calculates, as an arrival probability total product value of the selected adjacent point, the total product value obtained as a result of computing a total product of the "arrival probability total product value" of the final determined point and the arrival probability (not including retransmission) of a frame in the radio section between the selected final determined point and adjacent point (step S107). In this way, the setting unit 310 calculates an arrival probability total product value instead of calculating the additional value of costs related to communication.

The setting unit 310 determines whether this is either of a case where the "arrival probability total product value" of the adjacent point in the path tree data table indicates "not set" and a case where the "arrival probability total product value" of the adjacent point in the path tree data table is larger than the calculated total product value (step S108).

In a case that this is any of these cases (step S108: YES), the setting unit 310 proceeds the processing to step S110. In a case that this is neither of these cases (step S108: NO), the setting unit 310 determines whether the "arrival probability total product value" of the adjacent point and the calculated total product value are equal to each other and the "number of hops" of the adjacent point is larger than the "number of hops" of the final determined point by 2 or more (step S109).

In a case that the "arrival probability total product value" of the adjacent point and the calculated total product value are different from each other or the "number of hops" of the adjacent point is equal to or less than the "number of hops" of the final determined point or larger than the "number of hops" of the final determined point by 1 (step S109: NO), the setting unit 310 returns the processing to step S105.

In a case that the "arrival probability total product value" of the adjacent point and the calculated total product value are equal to each other and the "number of hops" of the adjacent point is larger than the "number of hops" of the final determined point by 2 or more (step S109: YES), the setting unit 310 sets the "arrival probability total product value" of the selected adjacent point at the calculated total product value. The setting unit 310 sets the "uplink" of the selected adjacent point at the final determined point. The setting unit 310 sets the "number of hops" of the selected adjacent point at a value obtained by adding 1 to the "number of hops" of the final determined point (step S110). The setting unit 310 returns the processing to step S105.

The setting unit 310 selects, as a final determined point, a point having the largest arrival probability total product value from among the points each having a determination flag of "not set" and having an arrival probability total product value being set. The setting unit 310 sets the determination flag of the selected final determined point at "determined" (step S111).

The setting unit 310 determines whether the determination flag indicates "determined" at all the end points for the starting point selected in step S102 (selected starting point) (step S112). In a case that the determination flag of any of the end points for the starting point selected in step S102 indicates "not set" (step S112: NO), the setting unit 310 returns the processing to step S104. In a case that the determination flags of all the end points for the starting point selected in step S102 indicate "determined" (step S112: YES), the setting unit 310 sets the calculation status of the starting point selected in step S102 at "calculated" (step S113).

Figure 7:
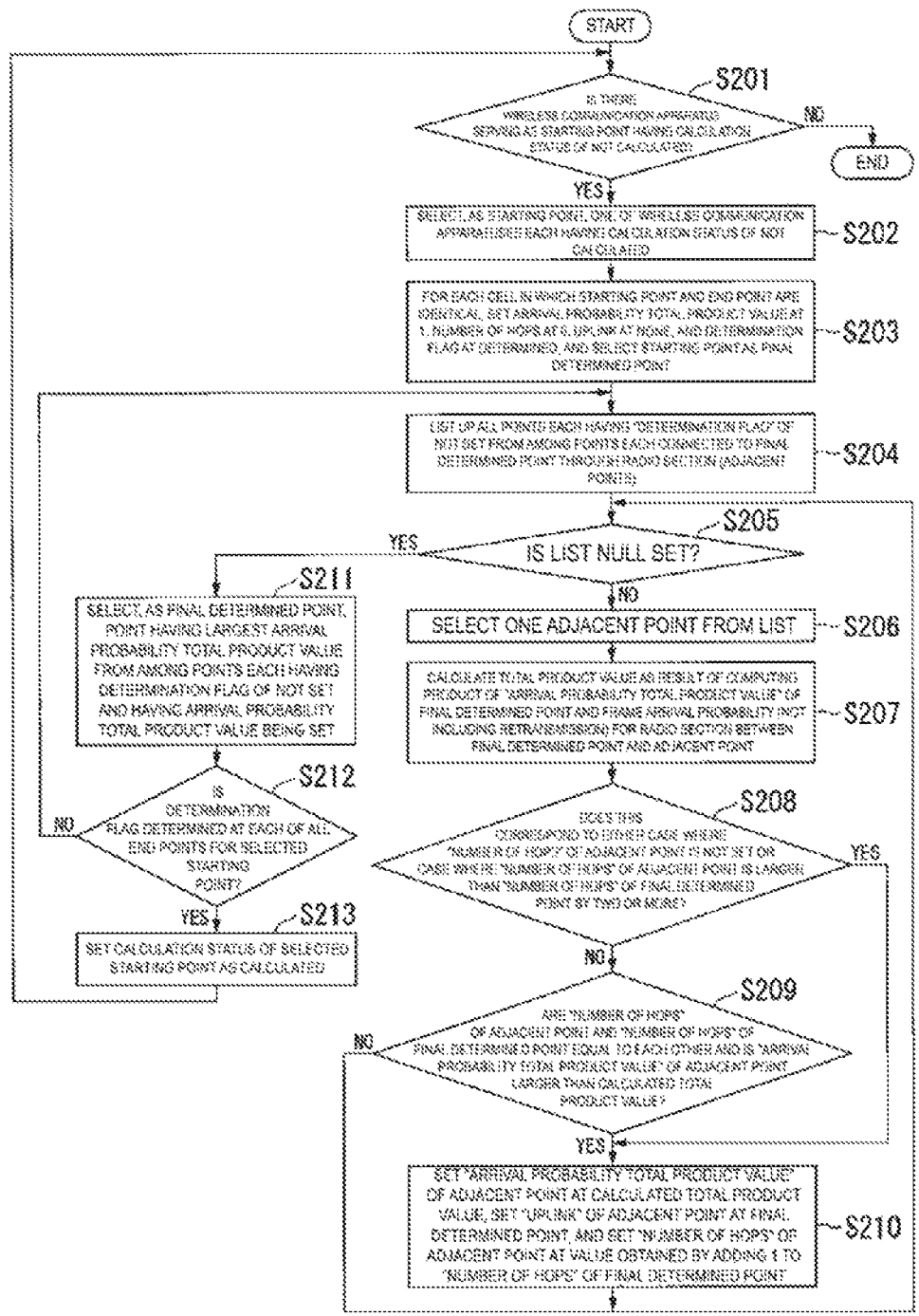
FIG. 7 is a flowchart illustrating an example of a procedure for setting a path tree data table by prioritizing the number of hops over arrival probability according to the embodiment.

FIG. 7 is a flowchart illustrating an example of a procedure for setting a path tree data table by prioritizing the number of hops over arrival probability. The wireless communication system 1 performs the operation procedure illustrated in FIG. 7 at a stage where a network of the wireless communication apparatuses 2 is established. Steps S201 to S207 are similar to steps S101 to S107 illustrated in FIG. 6.

The setting unit 310 determines whether this is either of a case where the "number of hops" of the adjacent point in the path tree data table indicates "not set" and a case where the "number of hops" of the selected adjacent point is larger than the "number of hops" of the final determined point by two or more (step S208).

In a case that this is any of these cases (step S208: YES), the setting unit 310 proceeds the processing to step S210. In a case that this is neither of these cases (step S208: NO), the setting unit 310 determines whether the "number of hops" of the adjacent point and the "number of hops" of the final determined point are equal to each other and the "arrival probability total product value" of the adjacent point is larger than the calculated total product value (step S209).

In a case that the "number of hops" of the adjacent point and the "number of hops" of the final determined point are different from each other, or in a case that the "arrival probability total product value" of the adjacent point is smaller than or equal to the calculated total product value (step S109: NO), the setting unit 310 returns the processing to step S205.

In a case that the "number of hops" of the adjacent point and the "number of hops" of the final determined point are equal to each other and the "arrival probability total product value" of the adjacent point is larger than the calculated total product value (step S209: YES), the setting unit 310 proceeds the processing to step S210. Steps S210 to S213 are similar to steps S110 to S113 illustrated in FIG. 6.

In the following, redundancy corresponds to the number of radio links simultaneously utilized for communication in the same radio section.

The redundancy is set for each radio section. According to the topology data 300 illustrated in FIG. 4, for example, the number of radio links available in the radio section "A-B" is two. Hence, in the radio section "A-B", the setting unit 310 can set the redundancy at up to "2" at maximum. Here, the setting unit 310 sets the "number of available radio links" in the topology data 300 at a value smaller than or equal to the smaller one of the numbers of radio units (antennas) of the two wireless communication apparatuses configuring both terminals of the radio section.

In a case that the redundancy is set at "2", the wireless communication apparatus performs redundant communication using two radio links simultaneously. The transmission-side wireless communication apparatus replicates one packet to be transmitted to the same radio section for both of the two radio links to be simultaneously utilized in the radio section. The transmission-side wireless communication apparatus utilizes the two radio links to transmit the packets resulting from the replication to the reception-side wireless communication apparatus. The reception-side wireless communication apparatus obtains the packet that arrived first of the two packets resulting from the replication. The reception-side wireless communication apparatus discards the packet other than the packet that arrived first.

In a case where the two radio links are utilized simultaneously, while the packet arrival probability (not including retransmission) of a first radio link is 0.80 (80%) and the packet arrival probability of a second radio link (not including retransmission) is 0.75 (75%), the probability that either of the radio frames resulting from the replication in one redundant communication arrives is 0.95 (95%). In this way, the wireless communication apparatuses can increase the reliability of the radio section by employing redundant communication.

Note that the wireless communication apparatus assigns a different channel for each radio link utilized for redundant communication. Each wireless communication apparatus includes a sufficient number of radio units (antennas) to allow a different channel to be assigned to each radio link.

In a case that the number of transmission times of a radio frame for each path exceeds a predetermined number of times, the setting unit 310 detects a radio section in which the arrival probability of radio frames is lower than a predetermined probability in the path having the largest total product value. The setting unit 310 may increase the redundancy of communication of the detected radio section.

Figure 8:
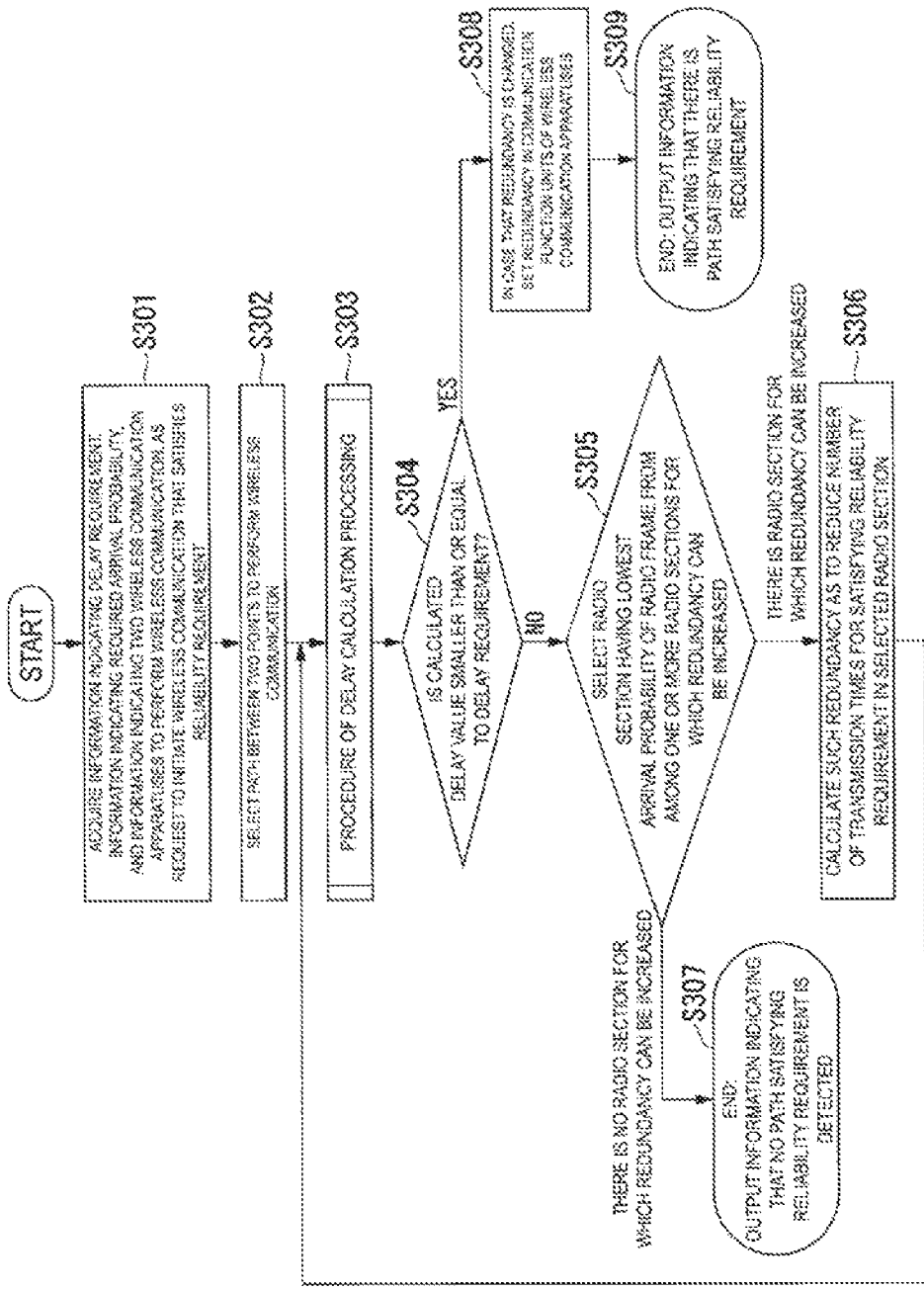
FIG. 8 is a flowchart illustrating an example of a procedure for setting redundancy that satisfies a reliability requirement according to the embodiment.

FIG. 8 is a flowchart illustrating an example of a procedure for setting redundancy that satisfies a reliability requirement.

The setting unit 310 executes, after performing the operation procedure illustrated in FIG. 6 or FIG. 7, an operation procedure illustrated in FIG. 8.

The setting unit 310 acquires information indicating a delay requirement, information indicating a required arrival probability, and information indicating two wireless communication apparatuses to perform wireless communication, as a request for initiation of wireless communication that satisfies the reliability requirement (step S301). The setting unit 310 selects a path between two points for performing wireless communication, in the arrival probability total product path tree (step S302). The setting unit 310 executes delay calculation processing, which is processing for calculating a worst delay value of a frame (step S303).

The setting unit 310 determines whether the calculated delay value is smaller than or equal to the delay requirement (step S304). In a case that the calculated delay value is less than or equal to the delay requirement (step S304: YES), the setting unit 310 proceeds the processing to step S308.

In a case that the calculated delay value exceeds the delay requirement (step S304: YES), the setting unit 310 determines whether there is a radio section having the lowest arrival probability of radio frames from among one or more radio sections for which the redundancy can be increased. In a case that there is a radio section having the lowest arrival probability of radio frames, the setting unit 310 selects the radio section having the lowest arrival probability of radio frames (step S305).

In a case that there is no radio section having the lowest arrival probability of radio frames (step S305: there is no radio section for which the redundancy can be increased), the setting unit 310 proceeds the processing to step S307. In a case that there is a radio section having the lowest arrival probability of radio frames (step S305: there is a radio section for which the redundancy can be increased), the setting unit 310 calculates redundancy that reduces the number of transmission times for satisfying the reliability requirement in the selected radio section (step S306). The setting unit 310 returns the processing to step S303.

The setting unit 310 outputs information indicating that a path satisfying the reliability requirement is not detected, and terminates the processing for setting the redundancy (step S307).

When the redundancy is changed, the setting unit 310 sets the redundancy in a communication function unit of the wireless communication apparatuses 2 (step S308). The setting unit 310 outputs information indicating that there is a path satisfying the reliability requirement, and terminates the processing for setting the redundancy (step S309).

Figure 9:
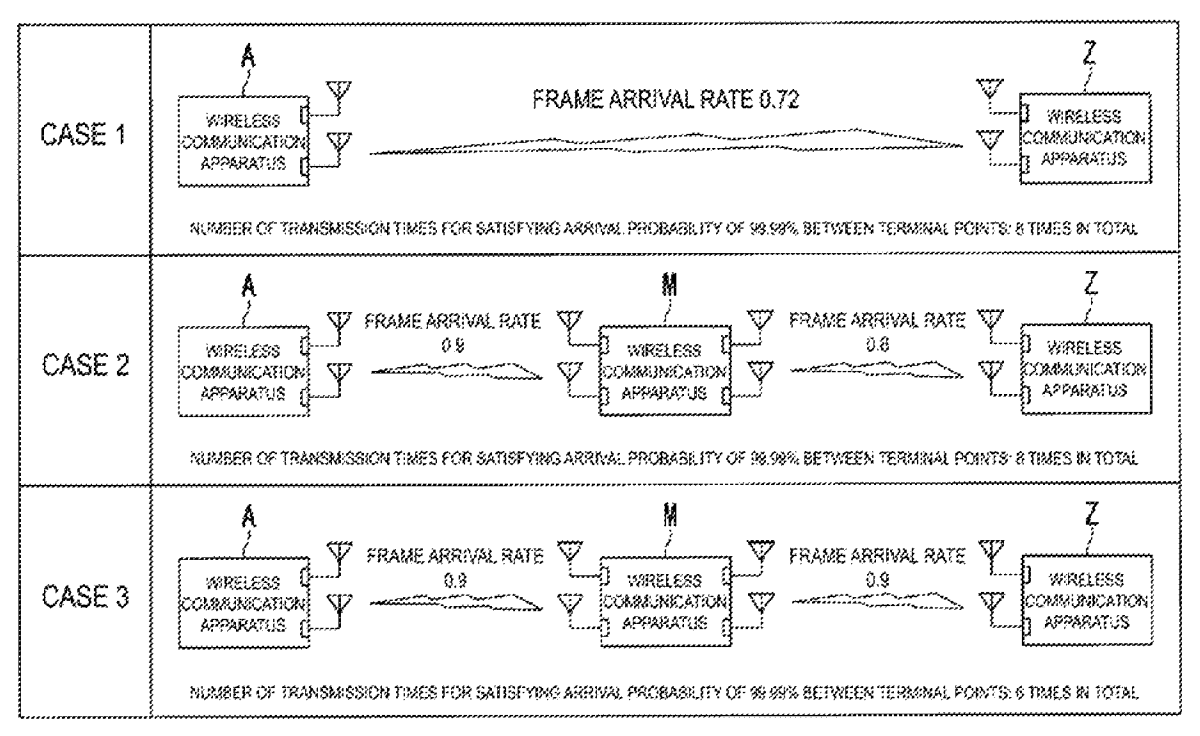

FIG. 9 is a diagram illustrating an example of the numbers of transmission times for satisfying a reliability requirement according to arrival probability total product values. In case 1, the wireless communication apparatus denoted by the reference sign A serves as a starting point, and the wireless communication apparatus denoted by the reference sign Z serves as an end point. In case 1, the arrival probability total product value is 0.72, which is equal to the frame arrival probability from the starting point to the end point. In case 2 and case 3, the wireless communication apparatus denoted by the reference sign A serves as a starting point, the wireless communication apparatus denoted by the reference sign M serves as a relay point, and the wireless communication apparatus denoted by the reference sign Z serves as an end point. In case 2, the arrival probability total product value is "0.72" corresponding to the total product value of 0.9, which is the frame arrival probability from the starting point to the relay point, and 0.8, which is the frame arrival probability from the relay point to the end point. In case 3, the arrival probability total product value is "0.81" corresponding to the total product value of 0.9, which is the frame arrival probability from the starting point to the relay point, and 0.9, which is the frame arrival probability from the relay point to the end point.

A case with a larger arrival probability total product value has a smaller number of transmission times for satisfying the reliability requirement (the frame arrival probability from the starting point to the end point). In other words, a case having a larger arrival probability total product value has smaller delay. Thus, a path having a larger arrival probability total product value satisfies more strict delay requirement.

Figure 10:
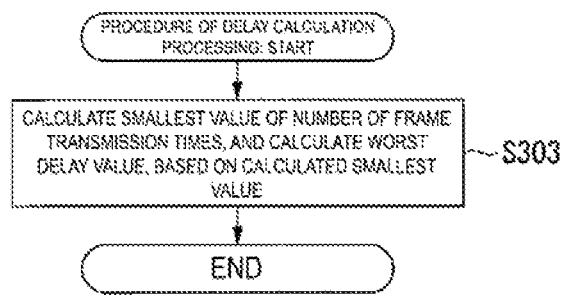
FIG. 10 is a flowchart illustrating an example of details of delay calculation processing according to the embodiment.
Figure 11:
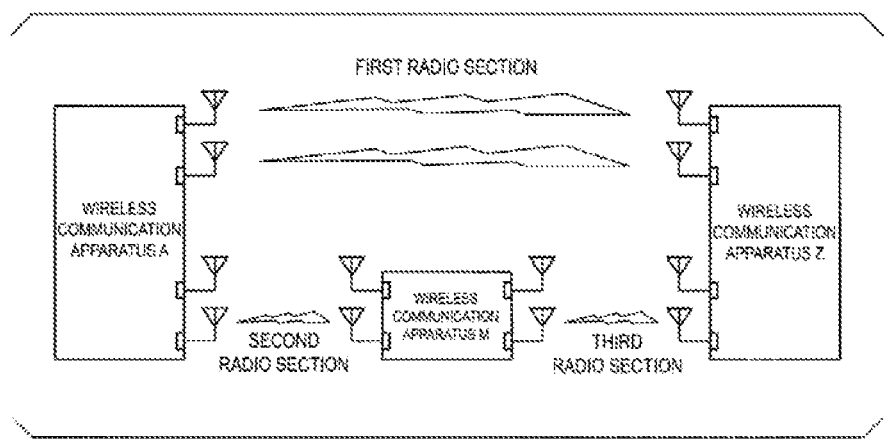
FIG. 11 is a diagram illustrating a first example of selection of a wireless multi-hop path of a known technique.
Figure 12:
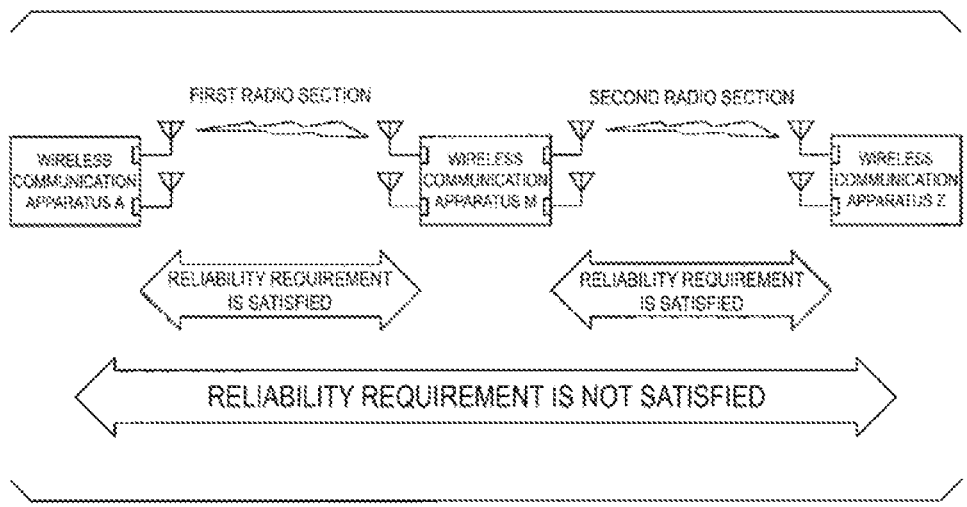
FIG. 12 is a diagram illustrating a second example of selection of a wireless multi-hop path of a known technique.
Figure 13:
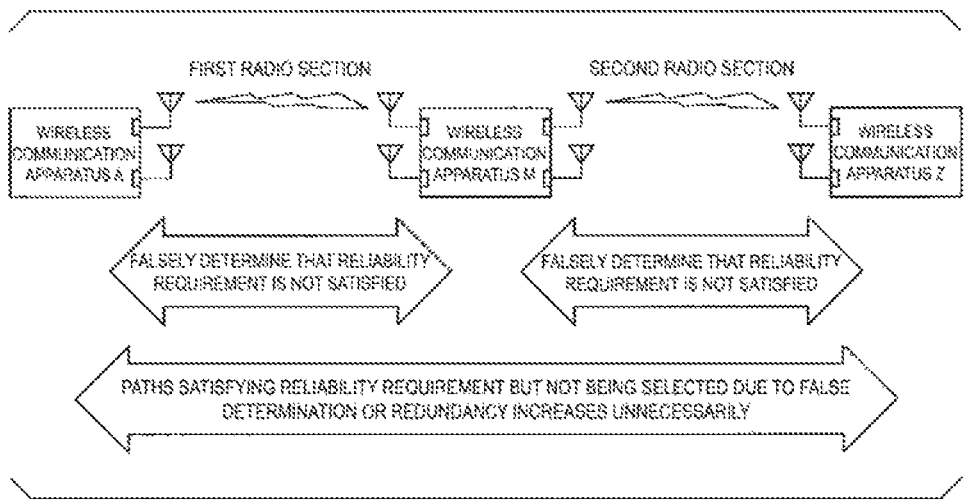
FIG. 13 is a diagram illustrating a third example of selection of a wireless multi-hop path of a known technique.

FIG. 10 is a flowchart illustrating a detailed example of the delay calculation processing (step S303 illustrated in FIG. 8). In the delay calculation processing in step S303 illustrated in FIGS. 8 and 10, the setting unit 310 calculates the smallest value of the number of frame transmission times. The setting unit 310 calculates the worst delay value, based on the calculated smallest value of the number of transmission times.

In the first example of the delay calculation processing, the setting unit 310 can accurately calculate the worst delay value, based on the smallest value S of the number of frame transmission times for satisfying the reliability requirement. The smallest value S of the number of frame transmission times for satisfying the reliability requirement is expressed as Equation (1).

[Math. 1]

$$S = \min\left\{ s \mid R \leq 1 - \sum_{k \leq i_1 + i_2 + \ldots + i_k \leq s} \left( \prod_{1 \leq j \leq k} r_j (1 - r_j)^{i_j} \right) \right\} \quad (1)$$

Here, R denotes a probability (such as 99.99%) serving as a reference of the reliability requirement. s denotes the number of frame transmission times for a packet arriving from one terminal point to the other terminal point of a path at or above the packet arrival probability R. S denotes the smallest value of the number of frame transmission times s. k denotes the number of hops between the terminal points of the path. $i_j$ denotes the number of frame transmission times in a radio link corresponding to a hop having the index j. $r_j$ denotes the frame arrival probability of the radio link corresponding to the hop having the index j.

Note that the amount of calculation increases as the number of hops increases. In a case that the amount of calculation for the right side ($\Pi r_j(1-r_j)^{ij}$) of Equation (1) is expressed as x, the calculation amount of Equation (1) is O(x $(s-k)^k$).

In the second example of the delay calculation processing, the setting unit 310 can calculate an approximate value of the worst delay value with a small amount of calculation, based on an approximate value of the smallest value S of the number of frame transmission times for satisfying the reliability requirement. The approximate value of the smallest value S of the number of frame transmission times for satisfying the reliability requirement is expressed as Equation (2).

[Math. 2]

$$S = \left\lceil \frac{\ln(F)}{\ln(f)} \right\rceil = \left\lceil \frac{\ln(1-R)}{\ln\left(1 - \prod_{1 \leq j \leq k} r_j\right)} \right\rceil \quad (2)$$

Here, R denotes a probability (such as 99.99%) serving as a reference of the reliability requirement. s denotes the number of frame transmission times for a packet arriving from one terminal point to the other terminal point of a path at or above the packet arrival probability R. S denotes an approximate value of the smallest value of the number of frame transmission times s. F denotes a complementary event (1−R). ln denotes a natural logarithm. k denotes the number of hops between the terminal points of the path. $r_j$ denotes the frame arrival probability of the radio link corresponding to the hop having the index j. $\Pi_{1 \leq j \leq k} r_j$ denotes the frame arrival probability obtained as the total product for the entire path. f represents a complementary event (1−$\Pi_{1 \leq j \leq k} r_j$).

When the nine number of R is large, the setting unit 310 can calculate an approximate value of the worst delay value, based on the approximate value S for the smallest value of the number of frame transmission times for satisfying the reliability requirement. The amount of calculation of Equation (2) is O(1).

Note that, when the frame arrival probability $r_j$ is close to 1 (larger than 0.9), the setting unit 310 can calculate a better approximate value of the worst delay value with a small amount of calculation, based on a better approximate value of the smallest value S of the number of frame transmission times for satisfying the reliability requirement. A better approximate value S □of the smallest value of the number of frame transmission times for satisfying the reliability requirement is expressed as Equation (3).

[Math. 3]

$$S' = \left\lceil \frac{\ln(1-R)}{\ln\left(1 - \prod_{1 \leq j \leq k} \min(r_j, 0.9)\right)} \right\rceil \quad (3)$$

As described above, the wireless communication system 1 according to the embodiment includes the three or more wireless communication apparatuses 2 and the control apparatus 3. The control apparatus 3 includes the setting unit 310 and the search unit 311. The setting unit 310 determines, for each of a plurality of paths from the first wireless communication apparatus 2 to the second wireless communication apparatus 2, an arrival probability total product value, which is a result of computing a total product of the arrival probabilities of radio frames (packets) of the respective radio sections constituting the path. The search unit 311 selects a path having the number of transmission times of a radio frame for the path smaller than or equal to a predetermined number of times (the number of times for satisfying the delay requirement) and having an arrival probability total product value being larger than or equal to a predetermined threshold (a value satisfying the reliability requirement). The search unit 311 may select a path having the largest arrival probability total product value.

With this configuration, it is possible for the wireless communication system 1 of the embodiment to select a path that satisfies a reliability requirement and a delay requirement for wireless multi-hops.

The control apparatus 3 is capable of constructing such a path so as to satisfy a reliability requirement between the terminal points of the path passing through a plurality of radio sections as wireless backhaul. The control apparatus 3 can improve the accuracy of determining whether the reliability requirement is satisfied in wireless multi-hops.

The control apparatus 3 can select a path that is easy to satisfy the reliability requirement (a path having the smallest worst delay value), instead of a path simply having the smallest number of hops (a path having the smallest average delay), in an arrival probability total product path tree of wireless multi-hops.

The control apparatus 3 is capable of constructing such a path so as to satisfy the reliability requirement between the terminal points of the path through a plurality of radio sections as wireless backhaul. Thus, the control apparatus 3 can extend the connection distance of highly reliable wireless communication.

For the processing of searching prioritizing arrival probability, the setting unit 310 uses an arrival probability of radio frames of each radio section (not including retransmission), instead of using costs, in an algorithm for calculating the shortest path tree. The setting unit 310 computes a total product of arrival probabilities, instead of adding costs. The setting unit 310 selects the highest probability in a comparison of arrival probabilities, instead of selecting the lowest cost in a comparison of costs. The setting unit 310 sets the initial cost at the starting point of a path at 1 and thereby calculates an arrival probability total product path tree table. In a case that there are a plurality of paths having the same total product value of all radio frame arrival probabilities (not including retransmission) of respective radio sections in a comparison of arrival probabilities, the search unit 311 may select a path having the smallest number of hops.

For the processing of searching prioritizing the number of hops, the setting unit 310 selects the path having the largest total product value of all the radio frame arrival probabilities (not including retransmission) of the respective radio sections in the path, through a comparison between paths having the same number of hops, in an algorithm for calculating the shortest path tree.

The setting unit 310 calculates a radio frame arrival probability (which may include retransmission) for each radio section, based on the reliability requirement representing the packet arrival probability within a time requirement, as in Equation (1).

The setting unit 310 calculates the number of transmission times of a radio frame in which the same radio frame can be transmitted at or above a predetermined arrival probability (which may include retransmission) in each radio section. The setting unit 310 calculates the number of transmission times of a radio frame that can be transmitted while the required arrival probability in the path between two points of the path tree (reliability requirement) is satisfied, based on a result of adding up all the values of the number of transmission times calculated for respective radio sections for all the radio sections of the path having the highest arrival probability.

As in Equation (2) or Equation (3), the setting unit 310 may determine the number of transmission times of a radio frame, based on a result of dividing the logarithm value of the complementary event of a predetermined arrival probability by the logarithm value of a complementary event of a result of computing a total product of radio frame arrival probabilities of respective radio sections for a plurality of paths.

The control apparatus 3 can calculate a path passing through a plurality of radio sections, such as a wireless backhaul, and calculate the worst delay value of the path according to Equations (1), (2), or (3) by using a probability R serving as a reference of a reliability requirement between two wireless communication apparatuses in the calculated path. The control apparatus 3 can set the redundancy for each radio section such that the worst delay value would be smaller than or equal to the delay requirement.

The embodiments of the present invention have been described above in detail with reference to the drawings. However, specific configurations are not limited to those embodiments, and include any design or the like within the scope not departing from the gist of the present invention.

The control apparatus and the wireless communication apparatuses in the above-described embodiments may be implemented with computers. In such a case, the control apparatus and the wireless communication apparatuses may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

INDUSTRIAL APPLICABILITY

The present invention is applicable to a wireless communication system.

REFERENCE SIGNS LIST

1 Wireless communication system
2 Wireless communication apparatus
3 Control apparatus
4 Radio section
30 Storage unit
31 Path search unit
300 Topology data
301 Path tree data table
310 Setting unit
311 Search unit
A to F, M, Z Wireless communication apparatus

The invention claimed is:

1. A wireless communication system comprising:
three or more wireless communication apparatuses; and
a control apparatus,
wherein the control apparatus includes
a processor; and
a storage medium having computer program instructions stored thereon, when executed by the processor, perform to:
determine, for each of a plurality of paths from a first one of the wireless communication apparatuses to a second one of the wireless communication apparatuses, a total product value being a result of multiplying arrival probabilities of radio frames of respective radio sections constituting the path and
select a path, among the plurality of paths, with the number of transmission times of the radio frame for each of the paths being a predetermined number of times or smaller and the total product value being a predetermined threshold or more.

2. The wireless communication system according to claim 1, wherein the computer program instructions further perform to determine the number of transmission times of the radio frame, based on a result of dividing a logarithm value of a complementary event of a predetermined arrival probability by a logarithm value of a complementary event of a result of the multiplying of the arrival probabilities of the radio frame of the respective radio sections for each of the plurality of paths.

3. The wireless communication system according to claim 1, wherein, in a case that the number of transmission times of the radio frame for each of the paths exceeds the predetermined number of times, the computer program instructions further perform to detect the radio section with the arrival probability of the radio frame being lower than a predetermined probability in a path with the total product value being the largest, and increases redundancy for communication of the detected radio section.

4. A control method executed by a wireless communication system including three or more wireless communication apparatuses and a control apparatus, the control method comprising:
at the control apparatus
determining, for each of a plurality of paths from a first one of the wireless communication apparatuses to a second one of the wireless communication apparatuses, a total product value being a result of multiplying arrival probabilities of radio frames of respective radio sections constituting the path and
selecting a path, among the plurality of paths, with the number of transmission times of the radio frame for each of the paths being a predetermined number of times or smaller and the total product value being a predetermined threshold or more.

5. The control method according to claim 4,
including, at the control apparatus, determining the number of transmission times of the radio frame, based on a result of dividing a logarithm value of a complementary event of a predetermined arrival probability by a logarithm value of a complementary event of a result of the multiplying of the arrival probabilities of the radio frame of the respective radio sections for each of the plurality of paths.

6. A control apparatus comprising:
a setting unit configured to determine, for each of a plurality of paths from a first one of three or more wireless communication apparatuses to a second one of the wireless communication apparatuses, a total product value being a result of multiplying arrival probabilities of radio frames of respective radio sections constituting the path and
a search unit configured to select a path, among the plurality of paths, with the number of transmission times of the radio frame for each of the paths being a predetermined number of times or smaller and the total product value being a predetermined threshold or more.

7. The control apparatus according to claim 6,
wherein the setting unit determines the number of transmission times of the radio frame, based on a result of dividing a logarithm value of a complementary event of a predetermined arrival probability by a logarithm value of a complementary event of a result of the multiplying of the arrival probabilities of the radio frame of the respective radio sections for each of the plurality of paths.

8. A non-transitory computer-readable medium having computer-executable instructions that, upon execution of the instructions by a processor of a computer, cause the computer to function as the control apparatus according to claim 6.

* * * * *